United States Patent [19]

Mott

[11] Patent Number: 4,463,702

[45] Date of Patent: Aug. 7, 1984

[54] WARNING DEVICES

[76] Inventor: Jonathan C. Mott, Old Forge Cottage, The Common, Wonersh Near Guildford, GU5 OPJ, England

[21] Appl. No.: 344,639

[22] Filed: Feb. 1, 1982

[30] Foreign Application Priority Data

Feb. 10, 1981 [GB] United Kingdom ................. 8103959
Jul. 27, 1981 [GB] United Kingdom ................. 8123052

[51] Int. Cl.[3] ......................... G02B 5/12; G09F 11/23

[52] U.S. Cl. .................................... 116/63 R; 40/602; 116/63 P; 350/99; 384/243

[58] Field of Search ............. 116/63 P, 63 C, DIG. 5, 116/63 T; 350/99; 40/602, 612; 384/243

[56] References Cited

U.S. PATENT DOCUMENTS

| | | | |
|---|---|---|---|
| 1,794,677 | 3/1931 | Dunwody | 116/63 P X |
| 1,798,052 | 3/1931 | Addition | 350/99 |
| 1,937,504 | 12/1933 | Bates | 350/99 |
| 2,781,017 | 2/1957 | Fuller et al. | 350/99 X |
| 2,797,621 | 7/1957 | Gladen | 350/99 |
| 2,948,257 | 8/1960 | Levey | 116/63 P |
| 3,318,279 | 5/1967 | Padilla | 116/63 P |
| 3,374,763 | 3/1968 | Browning | 350/99 X |
| 3,499,413 | 3/1970 | Heard | 116/63 P |
| 3,578,840 | 5/1971 | Richards | 350/99 |
| 3,732,842 | 5/1973 | Vara, Sr. | 116/63 C |
| 3,758,190 | 9/1973 | Douglas | 350/99 X |

FOREIGN PATENT DOCUMENTS

| | | | |
|---|---|---|---|
| 810379 | 4/1969 | Canada | 116/63 C |
| 523598 | 7/1940 | United Kingdom . | |
| 619548 | 3/1949 | United Kingdom . | |
| 939879 | 10/1963 | United Kingdom . | |
| 953571 | 3/1964 | United Kingdom . | |
| 1386219 | 3/1975 | United Kingdom . | |
| 2094533 | 9/1982 | United Kingdom | 40/612 |

*Primary Examiner*—Daniel M. Yasich

[57] ABSTRACT

A warning device, especially suitable for road-side use, comprises a rotor arranged to rotate about a substantially vertical axis, the rotor including three equi-angularly spaced apart cups arranged to drive the rotor in response to wind. Each cup is typically approximately hemispherical, and contains a respective outwardly facing reflector which is snap-fitted into a circumferential groove or the like in its inside surface. Each cup also has a further reflector fitted in its base, facing the opposite way to the main reflector, the backs of both reflectors being effectively sealed by the way they are fitted to the cup. The rotor is rotatably supported on a single ball bearing disposed between a downwardly facing flat surface within a recess in the rotor and the flat top of an upwardly extending stationary stub shaft.

5 Claims, 4 Drawing Figures

WARNING DEVICES

This invention relates to warning devices, and is more particularly but not exclusively concerned with warning devices for warning motorists of the presence of roadworks.

One well known form of warning device is constituted by an oil (or paraffin) lamp. However, this requires fairly frequent replenishment with oil or paraffin, and even so, may go out in the middle of the night, when its satisfactory operation is most desirable. Indeed, a recent brief survey by the Applicant, at roadworks near his home, revealed that over half of a group of such oil lamps warning of the presence of the roadworks had gone out.

Another well known form of warning device is constituted by a battery-powered flashing light, usually yellow or orange in colour. However, this kind of device is relatively expensive, and its batteries not only need relatively frequent replacement, but again may fail when most needed, viz in the middle of the night.

It is therefore an object of the present invention to provide a warning device in which the abovementioned problems are alleviated.

According to the present invention, there is provided a warning device comprising a wind-drivable rotor having at least one light-reflector secured thereto.

In a preferred embodiment of the invention, the rotor is arranged, in use, to rotate about a substantially vertical axis and comprises a plurality of, e.g. three, cup members, which are equiangularly spaced apart about said axis and oriented to drive the rotor in response to wind, each cup member having a respective outwardly facing reflector secured therein.

The cup members may typically be substantially conical, frusto-conical or hemispherical in shape, and are advantageously made from a plastics material.

The reflectors also are preferably made from a plastics material, and each of them may advantageously be snapfitted in a circumferential groove in the internal surface of its respective cup member.

Each cup member may also be provided with a further reflector, e.g. a cats-eye, facing rearwardly from its base.

The cup members may be mounted at the outer ends of respective arms which are secured to a central hub. In this case, the arms may be pivotally secured to the hub, so as to render the device collapsible for storage and/or transportation.

Alternatively and preferably, the cup members may be secured to a central hub by a planar connecting web extending radially of the hub, in which case the cup members may either be adapted to snap fit to the periphery of the web, or preferably, be moulded integrally with the web: in either case, the hub is preferably moulded integrally with the web.

The rotor may be rotatably supported on a needle-and-cup type bearing, that is a bearing in which either an inverted cup-like bearing member rests rotatably on the point of a vertically upwardly directed needle-like being member or a downwardly directed needle-like bearing member rests rotatably in a cup-like bearing member.

Alternatively and preferably, the rotor is rotatably supported on a bearing comprising a ball bearing disposed between a horizontally extending surface of the rotor and a stationary horizontally extending supporting surface: in this case, the rotor preferably comprises an inverted cup-like bearing member, and said stationary horizontally extending surface is preferably the top surface of a vertically upwardly extending shaft.

The rotor may be provided with a braking device, for example a centrifugally-operated braking device, to limit its rotational speed.

The device may advantageously be adapted to fit detachably in or to the top of a conventional plastics traffic cone, or alternatively may be formed integrally with such a cone. The device may also incorporate an electrical generator connected to be driven by the rotor, and a light, e.g. a flashing light, connected to be energised by the generator.

The invention will now be described, by way of example only, with reference to the accompanying drawings, of which:

Figure 1:
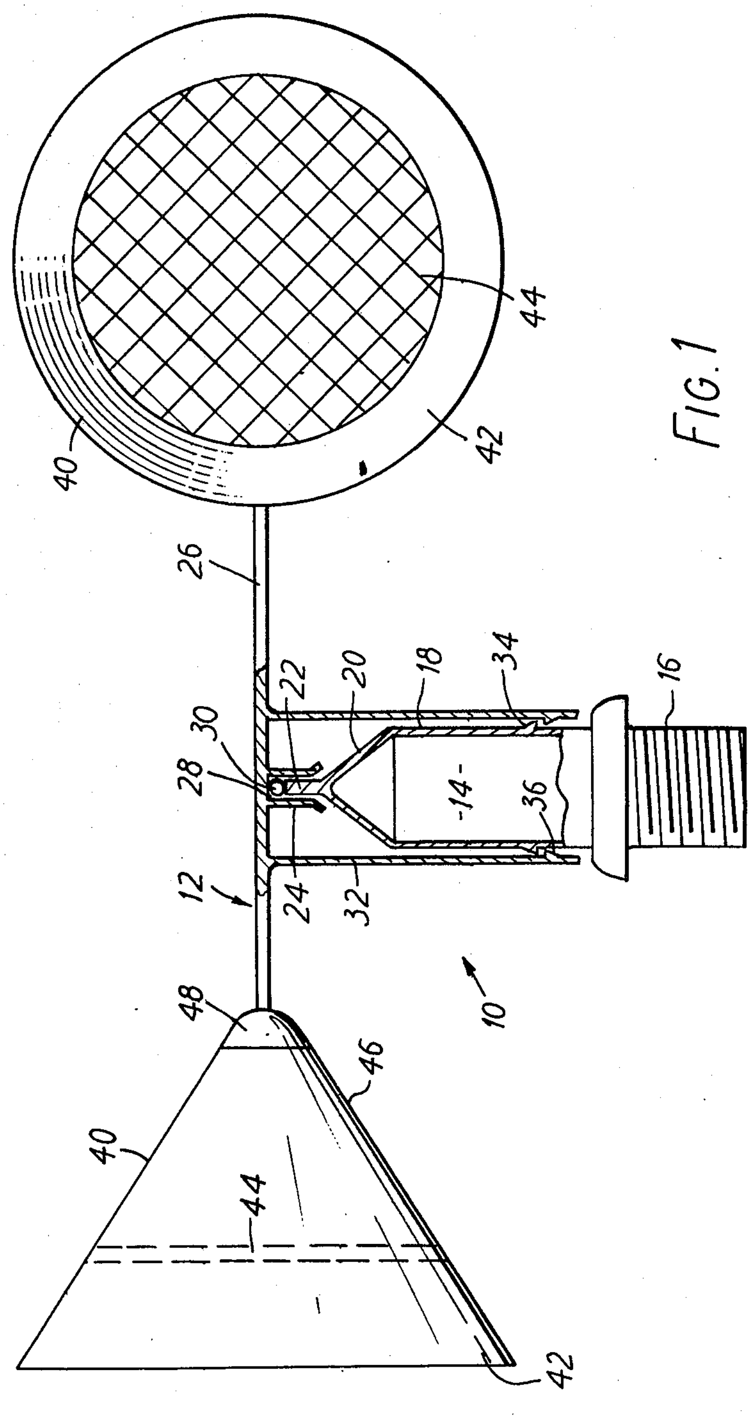
FIG. 1 is a somewhat diagrammatic elevational view, partly in section, of a warning device according to the present invention.
Figure 2:
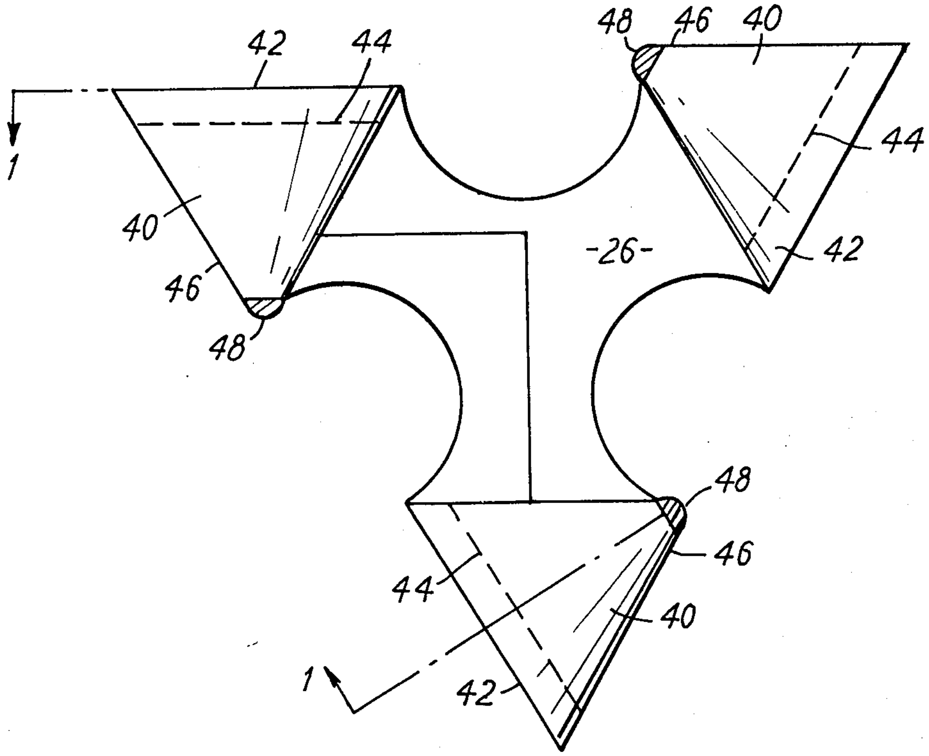
FIG. 2 is a plan view of the warning device of FIG. 1.

The warning device of FIGS. 1 and 2 is indicated generally at 10, and is intended primarily for use as a road traffic warning device, e.g. for warning of the presence of roadworks. As can be seen most clearly in FIG. 1, the device 10 basically comprises a rotor 12, which is supported to rotate about a substantially vertical axis by a vertically upwardly extending stator 14.

The stator 14 has a hollow threaded base portion 16, which is dimensioned to permit the device 10 to be attached to the top of an otherwise conventional plastics traffic cone (not shown). The base portion 16 is inserted into the coaxial hole normally present in the top of such a traffic cone, and secured to the top of the cone by means of a nut (not shown) threaded onto the base portion from inside the cone: alternatively, the thread on the base portion 16 can be self-tapping.

Above the base portion 16, the stator 14 comprises a hollow cylindrical locating portion 18, which is coaxial with the base portion and connected via a short conical section 20 to a solid stub shaft 22 coaxial with the portions 16 and 18.

The shaft 22 is coaxially surrounded, with a relatively small clearance, by the hub of the rotor 12, this hub being constituted by a cylindrical skirt 24. The skirt 24 is formed integrally with, and extends coaxially downwardly from, a horizontally extending planar web 26 which effectively constitutes a spoked rotor disc. The upper surface of the shaft 22 is flat, and defines, together with the skirt 24 and the portion of the underside of the web 26 within the skirt 24 (which portion is also flat), a cylindrical chamber 28 containing a ball bearing 30, typically of glass. A further cylindrical skirt 32, coaxial with the skirt 24, is formed integrally with the web 26, and extends downwardly therefrom to coaxially surround the locating portion 18 of the stator 14, again with a relatively small clearance. Thus the rotor 12 is rotatably supported on the stator 14 almost entirely by the single ball bearing 30, the co-operating cylindrical surfaces defined by the locating portion 18 and the skirt 32 and by the shaft 22 and the skirt 24 serving principally to centre the rotor on the stator.

The external surface of the locating portion 18 is provided with an annular, downwardly facing, ratchetlike tooth member 34. The tooth member 34 co-operates with a similar (but upwardly facing) tooth member 36, formed on the internal surface of the skirt 32, to ensure that once the rotor 12 has been snapped into position on the stator 14, it cannot easily (or accidentally) be removed. The tooth members 34, 36 thus consitute circumferential inter-engaging surface portions of the locating portion 18 (which is effectively an increased-diameter extension of the shaft 22) and of the skirt 24, which surface portions co-operate to hold the rotor 12 on the shaft 22.

The rotor 12 further comprises three cup members 40, which are substantially conical in shape and integrally attached at equiangularly spaced apart positions around the periphery of the web 26. The respective axes of the cup members 40 lie in a horizontal plane and are equidistant from the axis of the rotation of the rotor 12. The open ends 42 of the cup members 40 all face in the same direction circumferentially of the rotor, and are effectively closed by respective circular reflectors 44 coaxial therewith. The reflectors 44 are typically yellow, orange or red, and each of them is a snap fit in a circumferential groove formed in the internal surface of its respective cup member 40. The other end 46 of each cup member 40 may optionally have a further, but smaller, reflector 48 secured therein or thereto, for example a glass reflector of the kind known as cats-eye.

The stator 14 is moulded in one piece in a suitable plastics material, for example carbon fibre re-inforced nylon: this provides good wear-resistance for the shaft 22. Similarly, the rotor 12, except for the reflectors, is also moulded in one peice from a suitable plastics material, for example polypropylene.

In use, the device 10 is fitted to a traffic cone as described earlier, and placed near the roadworks or other hazard whose presence it is intended indicate. The cup members 40 cause the rotor 12 to behave similarly to an anemometer rotor, so that wind causes the rotor 12 to rotate. Because of the very low friction provided by the single ball bearing 30, the rotor 12 is caused to rotate even by a comparatively slight breeze, and once set rotating, continues to rotate for some time. Thus on busy roads such as motorways, small gusts of wind created by passing traffic can be sufficient to keep the rotor 12 rotating for significant proportions of the time, even when there is no natural wind at all. At night, the reflectors 40 reflect the light from the side lights or headlights of approaching traffic, producing an effect very similar to that produced by the kind of flashing warning light mentioned earlier, but without the necessity of batteries. Typically, the device 10 is visible at night at at least the same distance as conventional cats-eye type reflectors, but with the added attention-drawing feature of movement.

It will be appreciated that the device 10 is relatively inexpensive to manufacture, by virtue of its small number of parts and its moulded plastics and snap-together construction.

Many modifications can be made to the described embodiment of the invention. For example, instead of being supported on the ball bearing 30, the rotor 12 can be supported on a needle-and-cup type bearing, as shown in FIG. 3.

Figure 3:
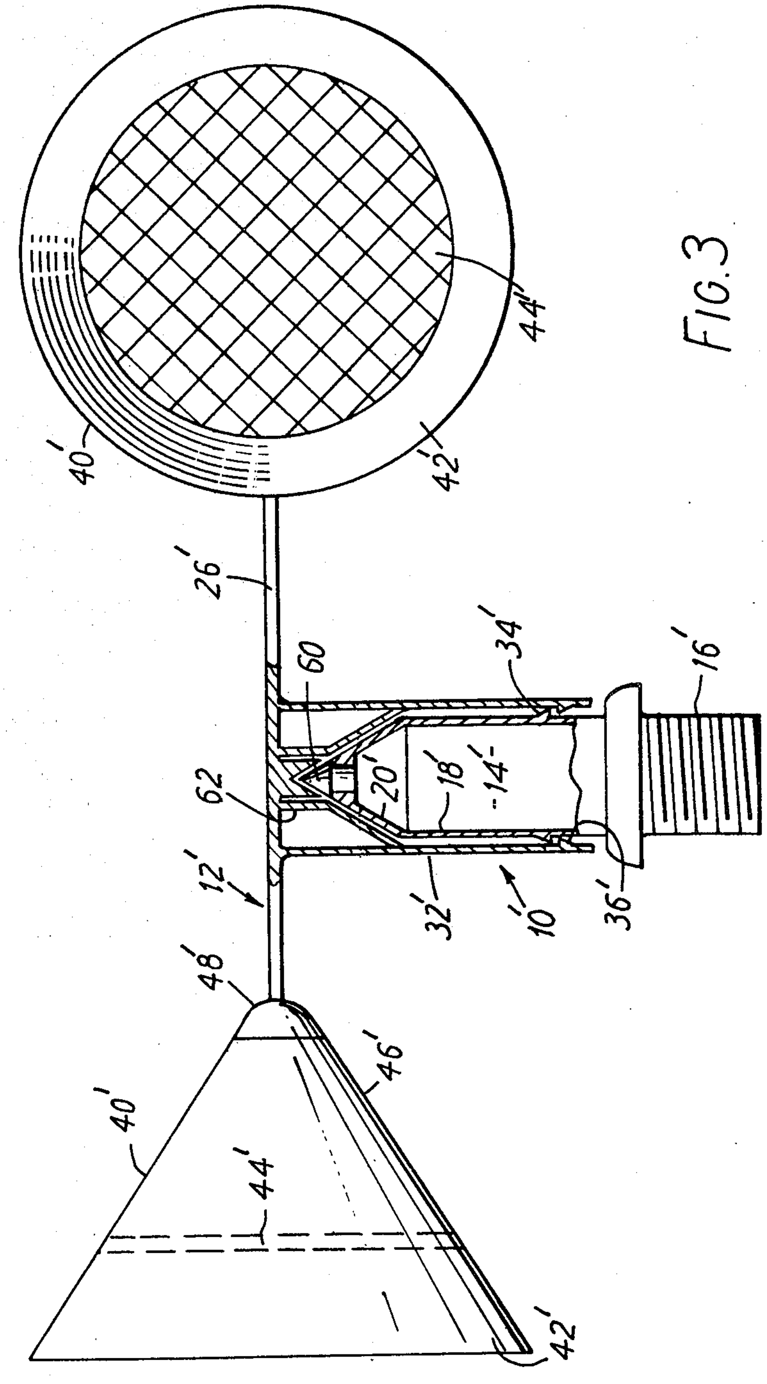
FIGS. 3 and 4 are respective views, similar to that of FIG. 1 and again partly in section, of alternative embodiments of the warning device of FIG. 1.

In FIG. 3, elements similar to those of FIGS. 1 and 2 have been given the same reference numbers as were used in FIGS. 1 and 2, but with a single prime, and only the points of difference will be described. Thus the stub shaft 22 of FIGS. 1 and 2 is replaced in the device 10' of FIG. 3 by a conical metal bearing insert 60, which is an interference fit in, and forms a flush continuation of, the conical section 20' of the stator 14' and which constitutes the needle of the needle-and-cup type bearing, while the skirt 24 of FIGS. 1 and 2 is replaced by an inverted conical bearing cup 62 substantially complementary to the conical bearing insert 60, and which is rotatably supported upon the point of the bearing insert.

Figure 4:
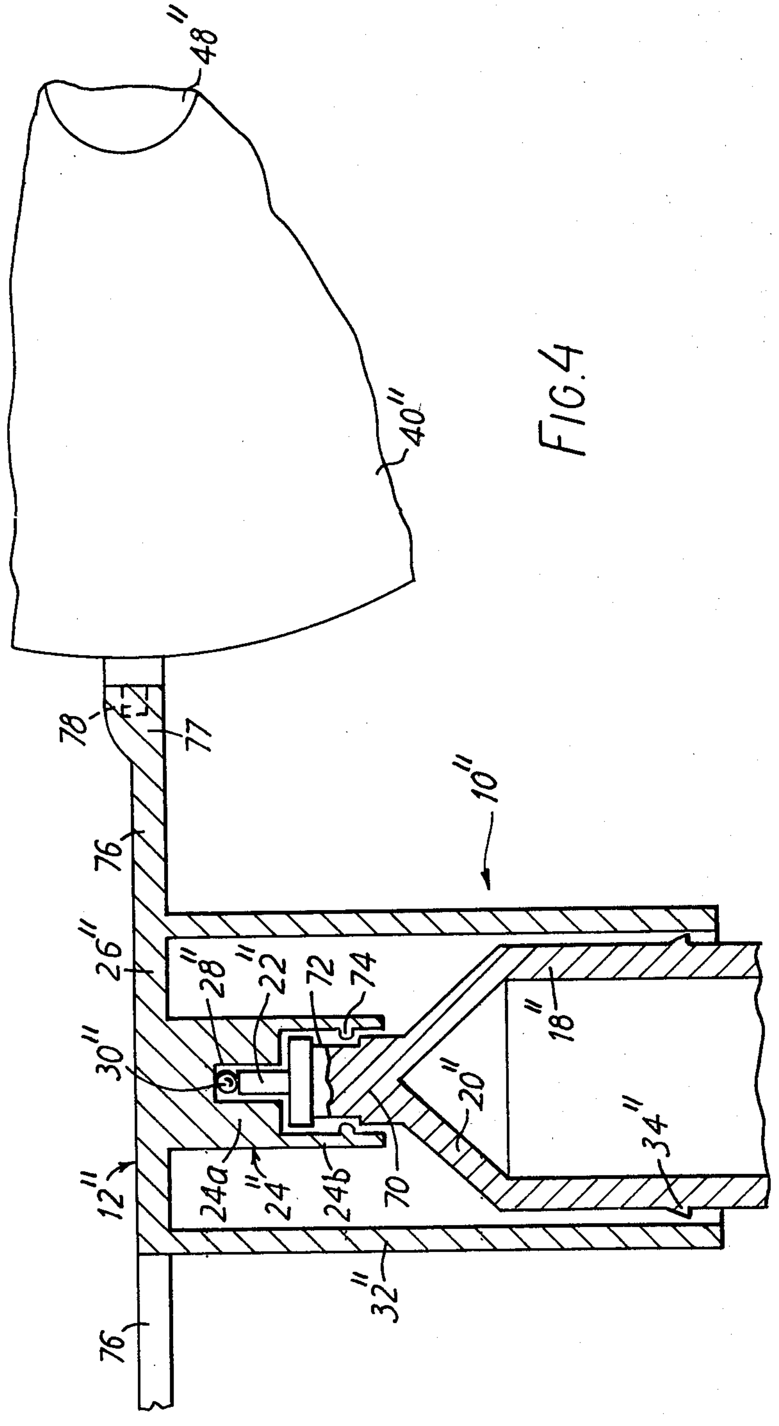

FIG. 4 shows yet another embodiment of the invention, and again, elements similar to those of FIG. 1 have been given the same reference members as were used in FIG. 1, but this time with a double prime. In the device 10 of FIG. 4, the short conical section 20'' is connected to the stub shaft 22'' by way of a short cylindrical section 70 whose diameter is greater than that of the shaft 22''. The section 70 has a circumferential groove 72 in its external surface, and the skirt 24'' constituting the hub of the rotor 12'' has two portions **24*a* and 24*b* which are sized to have respective internal diameters just larger than the respective external diameters of the shaft 22'' and the section 70. The skirt portion 24*b* has a radially inwardly projecting annular ridge 74 which is a snap fit within, and thus engages in, the groove 72, to lock the rotor 12'' on the stator 14''. The groove 72 and ridge 74 thus constitute circumferential inter-engaging surface portions of the section 70 (which is effectively an increased-diameter extension of the shaft 22'') and of the skirt 24'', which surface portions co-operate to hold the rotor 12 on the shaft 22''. As a result, the tooth member 36 on the skirt 32 of the FIG. 1 embodiment can be ommitted, but the tooth portion 34'' on the locating portion 18''** is retained for centering purposes.

The planer web or disc 26'' of the rotor 12'' of the FIG. 4 embodiment is circular, extends only to the skirt 32'', and has three equiangularly-spaced, integrally-formed, radially-extending arms 76 on its periphery, each arm terminating in a socket 77 shaped to receive an integrally-formed spigot 78 of a respective one of the cup members 40''. Each socket 77 and spigot 78 is of substantially circular section, but with two oppositely disposed flats, so that the spigots 78 can be inserted into the sockets 77 only in either of two 180° apart angular positions in which the cup members 40'' face in opposite directions circumferentially of the rotor 12. The cup members 40'' are mounting facing in one of these two directions when the device 10'' is to be mounted to the right of passing traffic, and in the other when the device is to be mounted to the left of passing traffic.

The cup members 40'' are hemispherical, and the smaller reflector 48'' is similar to the reflector 44'' (i.e. of the plastics moulded, multi-prism type), but significantly smaller. The grooves in which the reflectors 44'', 48'' snap fit are provided with equiangularly spaced integrally formed pips (not shown) which grip their respective reflectors.

It will be appreciated that the provisions of reflectors facing both ways from each cup member 40'' ensures that even if the rotor 12'' is stationary, at least one reflector is positioned to reflect light received from oncoming traffic.

To increase the overall diameter of the rotor 12'', respective, extension arms (not shown) can be interposed between each cup member 40'' and the rotor disc 26''.

Various other modifications can be made to the described embodiments of the invention. For example, the bearing insert 60 need not be of metal, but can be formed integrally with the conical section 20' (and in the same plastics material). Also the devices 10, 10' and 10" can be provided with a hollow conical base or a plurality of angled legs, designed to fit over a standard traffic cone or to be free-standing. Alternatively, they can be provided with a suction-cup base, to permit them to be stuck, for example, to a broken-down vehicle, to serve as a warning.

If desired, the devices 10, 10' and 10" can be provided with a braking device, particularly a centrifugally operated braking device, to limit its rotational speed in high winds. Further, the rotor 12 can be arranged to drive a simple electrical generator, e.g. of the bicycle type dynamo, arranged to power a light, especially a flashing light.

Finally, the devices 10, 10' and 10" can be used in other applications, e.g. as a bird-scaring device, in which case the rotors 12, 12' and 12" can have fluttering strips secured thereto as well as or instead of their respective reflectors. Yet another application is to secure a small version of the one of the devices to a bicycle, for example with its rotation axis coaxial with a wheel axis, to serve as a warning devices. The device can also be used in marine applications, e.g. on buoys, docks and boats.

I claim:

1. A warning device comprising a stator, and a wind-drivable rotor which is rotatably supported on the stator to rotate, in use, about a substantially vertical axis, and which comprises a plurality of cup members which are equiangularly spaced apart about said axis and oriented to drive the rotor in response to wind, each cup member having a respective outwardly facing reflector secured therein;

wherein the rotor comprises a central hub, and mounting means for mounting each cup member on the hub in at least two substantially 180° apart angular orientations in which the cup members face in opposite directions circumferentially of the hub, to permit driving of the rotor in either of two opposite rotational directions; and wherein the rotor is supported on the stator by a bearing comprising a vertically-extending shaft, an annular cup-like bearing member which coaxially surrounds the shaft and defines therewith a pair of spaced horizontally extending surfaces forming parts of respective ones of the stator and the rotor, and single ball bearing disposed between said horizontally extending surfaces, the internal surface of said cup-like bearing member and the external surface of said shaft being provided with circumferential inter-engaging surface portions which co-operate to hold the rotor on the shaft.

2. A warning device as claimed in claim 1, said device being adapted to fit detachably to the top of a conventional plastics traffic cone.

3. A warning device as claimed in claim 1, wherein the cup members are approximately hemispherical in shape.

4. A warning device as claimed in claim 1, wherein each reflector is snap-fitted in circumferential mounting structure formed in the internal surface of its respective cup member.

5. A warning device as claimed in claim 1, wherein each cup member is provided with a further reflector facing rearwardly from its base.

* * * * *